UNITED STATES PATENT OFFICE.

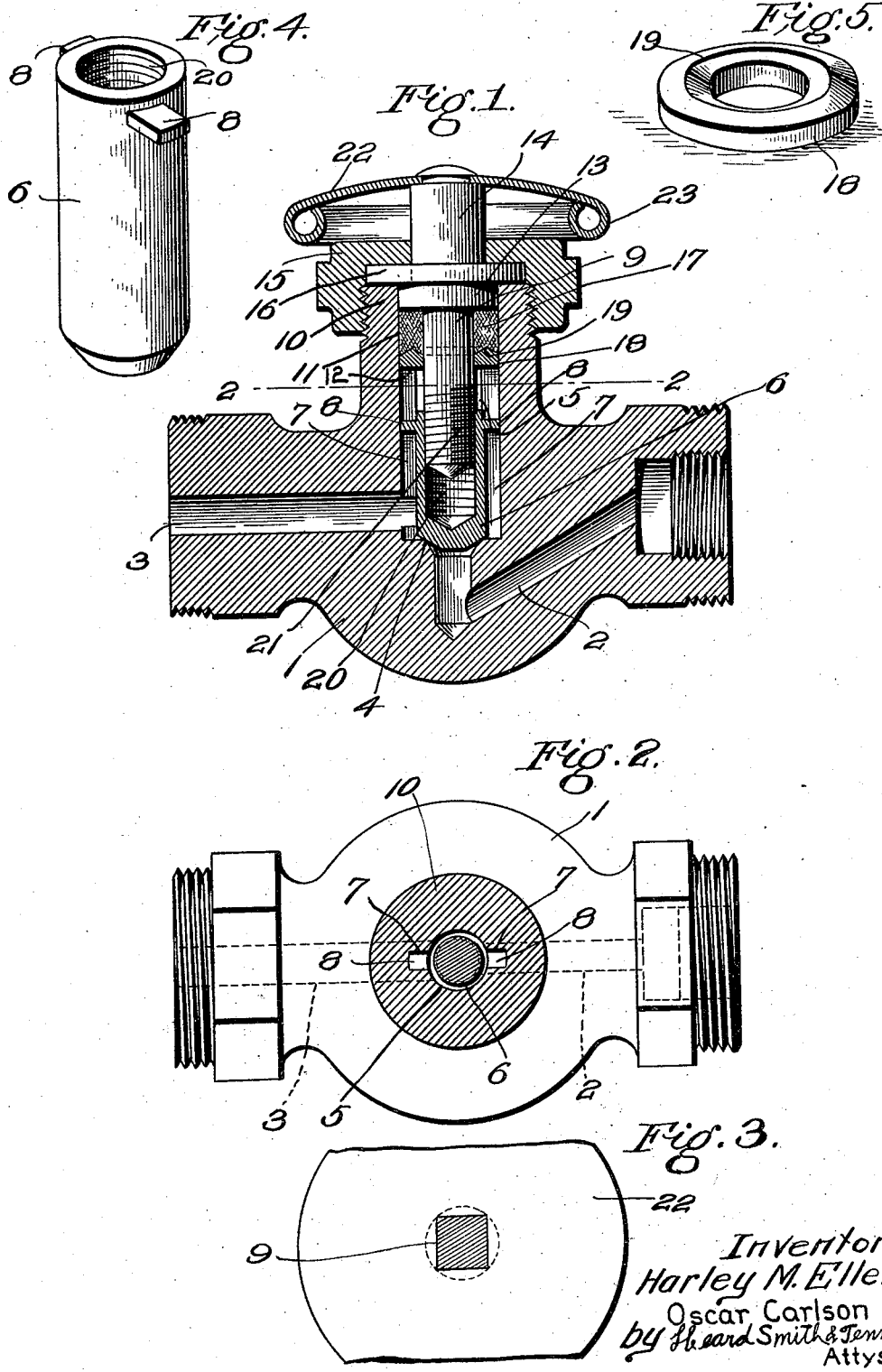

HARLEY M. ELLER AND OSCAR CARLSON, OF BOSTON, MASSACHUSETTS.

VALVE.

1,414,118.  Specification of Letters Patent.  Patented Apr. 25, 1922.

Application filed April 15, 1919, Serial No. 290,207. Renewed February 2, 1922. Serial No. 533,646.

*To all whom it may concern:*

Be it known that we, HARLEY M. ELLER and OSCAR CARLSON, citizens of the United States, and residents of Boston, county of Suffolk, State of Massachusetts, have invented an Improvement in Valves, of which the following description, in connection with the accompanying drawing, is a specification, like characters on the drawing representing like parts.

This invention relates to valves and has for its object to provide a valve suitable for general use which will always be firmly seated against the valve seat without any turning or twisting motion of the valve which is liable to wear the seat of the valve.

A further object of our invention is to provide an improved manner of packing the valve stem to make a tight connection, and otherwise to improve valves as will be more fully hereinafter set forth.

In order to give an understanding of our invention, we have illustrated in the drawings a selected embodiment thereof which will now be described, after which the novel features will be pointed out in the appended claims.

In the drawings, Fig. 1 is a sectional view of a valve embodying our invention;

Fig. 2 is a section on the line 2—2, Fig. 1;

Fig. 3 is a fragmentary view of the handle or disk by which the valve stem is operated;

Fig. 4 is a perspective view of the valve member;

Fig. 5 is a perspective view of the washer used in connection with the packing for the valve stem.

1 indicates the valve casing which may be of any suitable or usual shape and which is provided with an inlet passage 2 and an outlet passage 3, said passages communicating with each other through a valve seat 4. The valve casing 1 is provided with a valve chamber 5 in which the valve member 6 is received, said valve chamber having guiding grooves 7 formed in its walls to receive guiding projections 8 that extend from the valve member 6.

The valve seat 4 is preferably made in the form of a rounded shoulder and the valve is shown as provided with a beveled face 30 which seats against the shoulder. By means of this construction the engagement between the valve member and the valve seat is on an annular line and there is, therefore, less liability that dirt or other foreign matter will accumulate on the valve seat to prevent a tight fit.

In the embodiment herein shown the valve chamber 5 is cylindrical in cross-section and the valve member 6 is of a similar shape. The presence of the projections 8 and grooves 7 cause the valve to move toward and from the valve seat in a direction parallel to the axis thereof and prevent the valve from having any turning movement.

Suitable valve-operating mechanism is provided for giving the valve its opening and closing movement in the right line direction above referred to. The valve-operating mechanism herein shown comprises a valve stem or valve actuator 9 which is mounted for turning movement in the neck portion 10 of the valve casing and which has screw-threaded engagement with the valve so that the turning movement of the stem 9 moves the valve toward and from the valve seat. The neck portion 10 of the valve casing is provided with the opening or chamber 11 which communicates with the valve chamber 5, but has a greater diameter than said chamber so that a shoulder 12 is provided between said chambers. The chamber 11 constitutes a packing-receiving chamber to receive packing for the valve-actuating member 9. Said valve-actuating member is provided with the enlarged portion 13 which fits the chamber 11 and said packing is held in its operative position partly by this collar 13 and partly by the fact that the end portion 14 of the valve-actuator extends through and has bearing in a cap member 15 which is screw-threaded to the end of the neck 10. A washer 16 is shown interposed between the cap member and the end of the neck portion 10, said washer having bearing against the enlarged portion 13 of the stem.

17 indicates a packing of some yielding material which encircles the stem 9 and fills the chamber 11 beneath the enlarged portion 13. 18 is a packing washer which rests on the shoulder 12 and which is provided with an annular rib 19 on its upper face, said rib acting against the packing material 17 and forcing it both outwardly against the wall of the chamber 11 and inwardly against the stem 9.

The screw-threaded engagement between the stem 9 and valve member 6 may be provided for in various ways. One convenient way is to make the valve with the interior screw-threaded recess 20 and to provide the stem 9 with the screw-threaded extension 21 adapted to enter the recess and engage the screw-threads therein.

The exterior end 14 of the stem 9 will preferably be provided with a handle 22 in the form of a disk. This disk 22 can conveniently be struck up from sheet metal and may have its edges spun over, as shown at 23, to make a handle which is more convenient to grasp.

In assembling the parts the valve member will first be inserted into the valve chamber with the projections 8 occupying the grooves 7 and then the packing member 17 and washer 18 may be applied to the valve stem and the latter may be inserted into the chamber 11 and turned so as to effect the screw-threaded engagement between the extension 21 and the valve member. As the valve stem is being screwed into the valve member the cap member 15 may be at the same time screwed onto the neck 10. When the cap is finally in place the packing member 17 will be compressed between the enlarged portion 13 of the chamber and the collar 18 and will thus make a tight joint around the stem. The turning of the stem in one direction or the other will either open or close the valve and since the valve is guided in its right line direction by means of the guiding ribs 8 and grooves 7 the only movement which the valve can have is one toward and from the seat. The valve will always seat itself in exactly the same position.

We claim:

1. In a valve, the combination with a valve casing having a valve chamber provided with a valve seat at one end and having guiding grooves formed in its side walls, said valve casing having a neck provided with a packing-receiving chamber which is larger than the valve chamber and communicates therewith, of a valve member in said valve chamber having guiding wings extending laterally therefrom and slidably received in said grooves, a valve stem extending through the packing-receiving chamber and having screw-threaded engagement with the valve member, said valve stem having an enlarged portion that fills the upper end of the packing-receiving chamber and comes flush with the top of the neck, a packing member situated inside said packing-receiving chamber beneath the enlarged portion of the stem, and means to cause the packing to expand into engagement with the wall of said chamber and the valve stem.

2. In a valve, the combination with a valve casing having a valve chamber provided with a valve seat at one end and having guiding grooves formed in its side walls, said valve casing having a neck provided with a packing-receiving chamber which is larger than the valve chamber and communicates therewith, of a valve member in said valve chamber having guiding wings extending laterally therefrom and slidably received in said grooves, a valve stem extending through the packing-receiving chamber and having screw-threaded engagement with the valve member, said valve stem having an enlarged portion that fills the upper end of the packing-receiving chamber, a compressible packing member surrounding said valve stem beneath said enlarged portion, and a washer at the lower end of the packing-receiving chamber and provided at its upper side with a rib that operates to expand the packing into engagement with the wall of the chamber and the valve stem.

3. In a valve, the combination with a valve casing having a valve chamber provided with a valve seat at one end and having guiding grooves formed in its side walls, said valve casing having a neck provided with a packing-receiving chamber which is larger than the valve chamber and communicates therewith, of a valve member in said valve chamber having guiding wings extending laterally therefrom and slidably received in said grooves, a valve stem extending through the packing-receiving chamber and having screw-threaded engagement with the valve member, said valve stem having an enlarged portion that fills the upper end of the packing-receiving chamber, a compressible packing member surrounding said valve stem beneath said enlarged portion, and means acting on the packing to force the latter firmly against both the walls of the chamber and the valve stem.

In testimony whereof, we have signed our names to this specification.

HARLEY M. ELLER.
OSCAR CARLSON.